(12) United States Patent
Blueford

(10) Patent No.: US 7,142,104 B1
(45) Date of Patent: Nov. 28, 2006

(54) MESSAGE DISPLAY SYSTEM

(76) Inventor: Helen Blueford, 11372 Mineral Peak Ct., Alta Loma, CA (US) 91701

( * ) Notice: Subject to any disclaimer, the term of this patent is extended or adjusted under 35 U.S.C. 154(b) by 122 days.

(21) Appl. No.: 10/127,635

(22) Filed: Apr. 22, 2002

(51) Int. Cl.
*B60Q 1/62* (2006.01)

(52) U.S. Cl. ............ 340/472; 340/426.13; 340/426.17; 340/426.35; 340/463; 340/464; 340/471; 362/600; 362/632; 362/634

(58) Field of Classification Search ........... 340/463, 340/469, 471, 472, 426.13, 426.17, 426.35, 340/464; 362/800
See application file for complete search history.

(56) References Cited

U.S. PATENT DOCUMENTS

| | | | |
|---|---|---|---|
| 5,105,179 A | | 4/1992 | Smith |
| 5,579,008 A | | 11/1996 | Hulderman et al. |
| 5,905,434 A | | 5/1999 | Steffan et al. |
| 6,124,783 A | * | 9/2000 | Alexander .................... 340/426 |
| 6,262,807 B1 | * | 7/2001 | Pleotis ........................ 358/1.2 |
| 6,404,327 B1 | * | 6/2002 | Naddeo ...................... 340/426 |
| 2003/0142044 A1 | * | 7/2003 | Berry .......................... 345/55 |

* cited by examiner

*Primary Examiner*—Julie Bichngoc Lieu

(57) ABSTRACT

A message display system includes a main housing that is couplable to a vehicle. The main housing has bezel portion designed for encompassing a perimeter edge of a license plate. The main housing has a top display means for presenting a visual message. The top display means is medially positioned on a top portion of the main housing. A receiver portion is operationally coupled to the top display means. The receiver portion is positioned substantially within the housing. The receiver portion facilitates input of a message to be visually presented. A remote transmitter member is designed for receiving user input of a message to be visually presented. The remote transmitter member is operationally couplable to the receiver portion such that the message is communicated from the remote transmitter to the receiver portion.

19 Claims, 4 Drawing Sheets

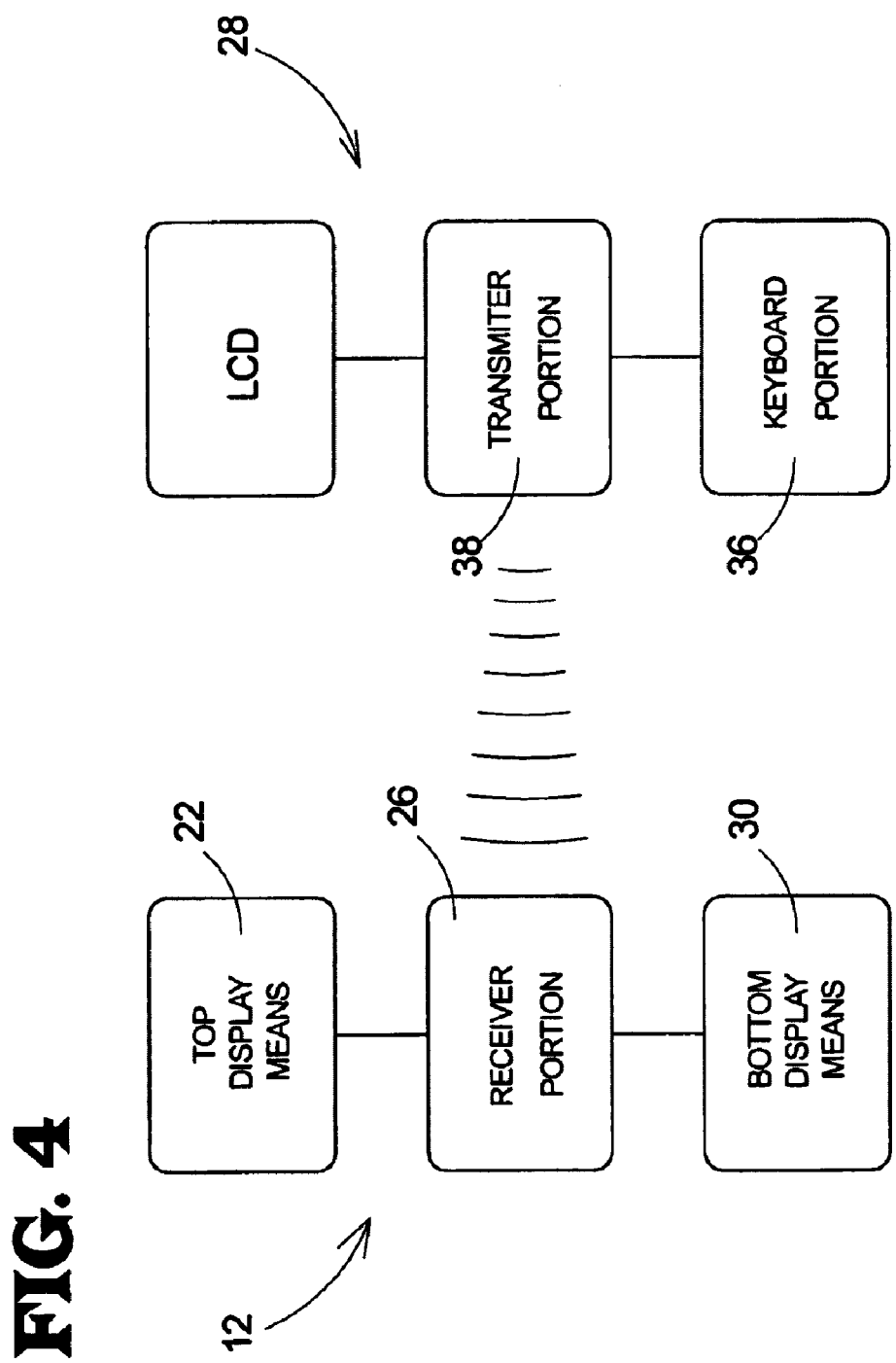

MESSAGE DISPLAY SYSTEM

BACKGROUND OF THE INVENTION

1. Field of the Invention

The present invention relates to messaging systems and more particularly pertains to a new message display system for displaying a series of messages that allows a user to express their thoughts and personalities.

2. Description of the Prior Art

The use of messaging systems is known in the prior art. U.S. Pat. No. 5,105,179 describes an electronic license display comprised of an LCD and capable of serving as a message center. U.S. Pat. No. 5,905,434 describes a communications system using an LCD unit capable of displaying various messages controlled remotely from the interior of a vehicle. Another type of messaging system is U.S. Pat. No. 5,579,008 describing an electronic license plate system.

While these devices fulfill their respective, particular objectives and requirements, the need remains for a license plate communication system.

SUMMARY OF THE INVENTION

The present invention meets the needs presented above by providing a license plate communication system utilizing a wireless keyboard.

Another object of the present invention is to provide a new message display system that would allow the user to display a variety of messages and graphics around their license plate without having to physically change the license plate frame.

Still another object of the present invention is to provide a new message display system that could be used to relay messages to others following behind you.

To this end, the present invention generally comprises a main housing that is couplable to a vehicle. The main housing has bezel portion designed for encompassing a perimeter edge of a license plate. The main housing has a top display means for presenting a visual message. The top display means is medially positioned on a top portion of the main housing. A receiver portion is operationally coupled to the top display means. The receiver portion is positioned substantially within the housing. The receiver portion facilitates input of a message to be visually presented. A remote transmitter member is designed for receiving user input of a message to be visually presented. The remote transmitter member is operationally couplable to the receiver portion such that the message is communicated from the remote transmitter to the receiver portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a block diagram view of the present invention.

DESCRIPTION OF THE PREFERRED EMBODIMENT

Figure 1:
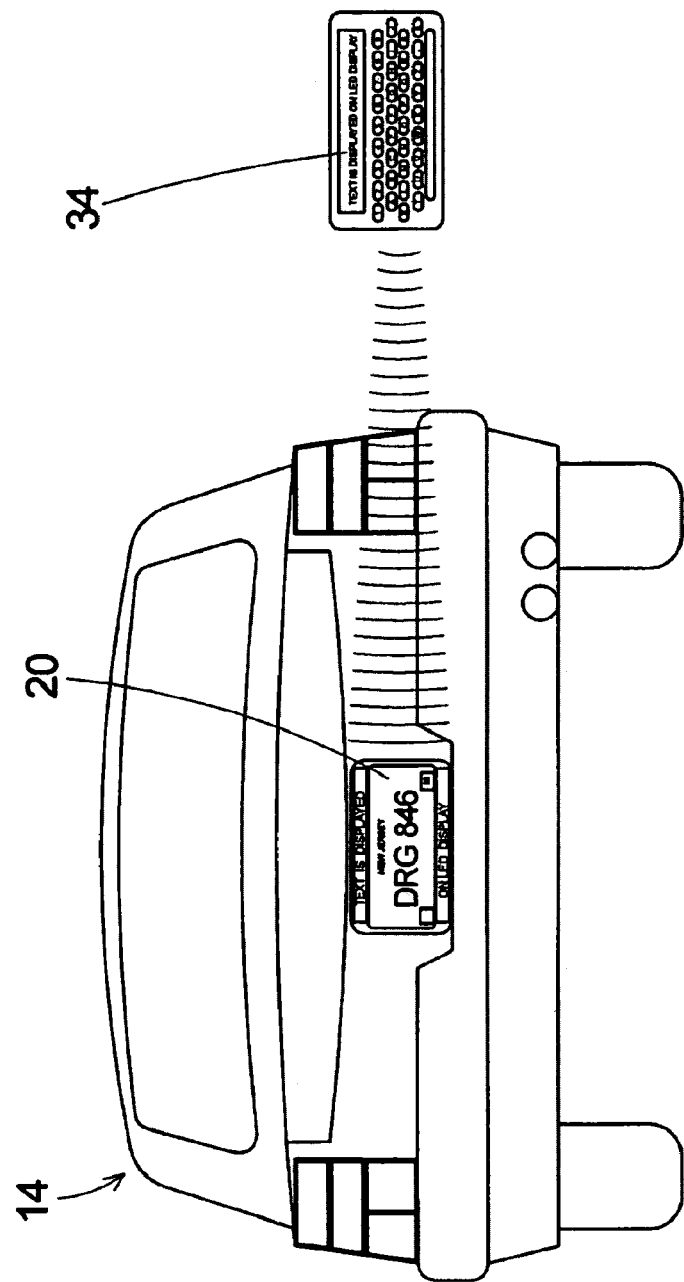
FIG. 1 is a in-use view of a new message display system according to the present invention.
Figure 2:
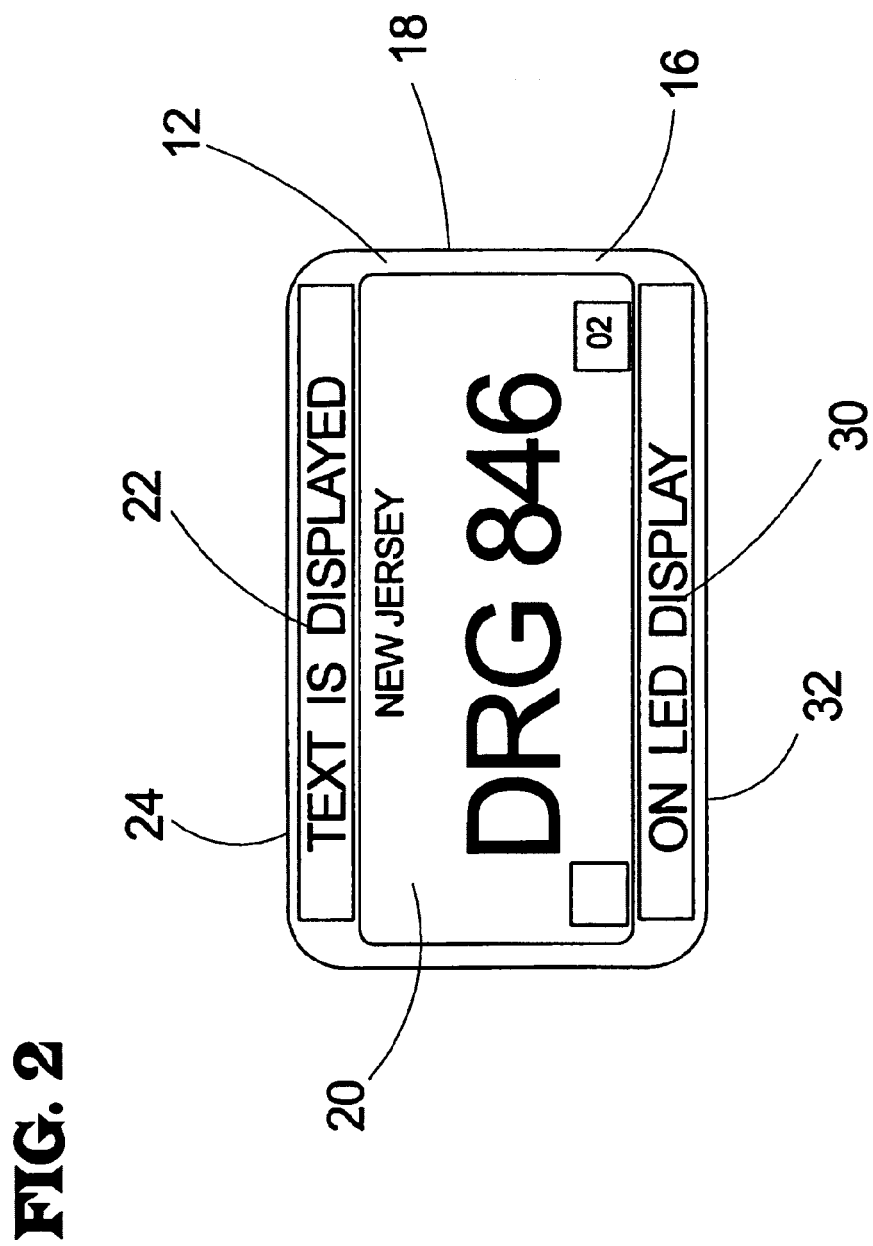
FIG. 2 is a front view of main housing portion the present invention.
Figure 3:
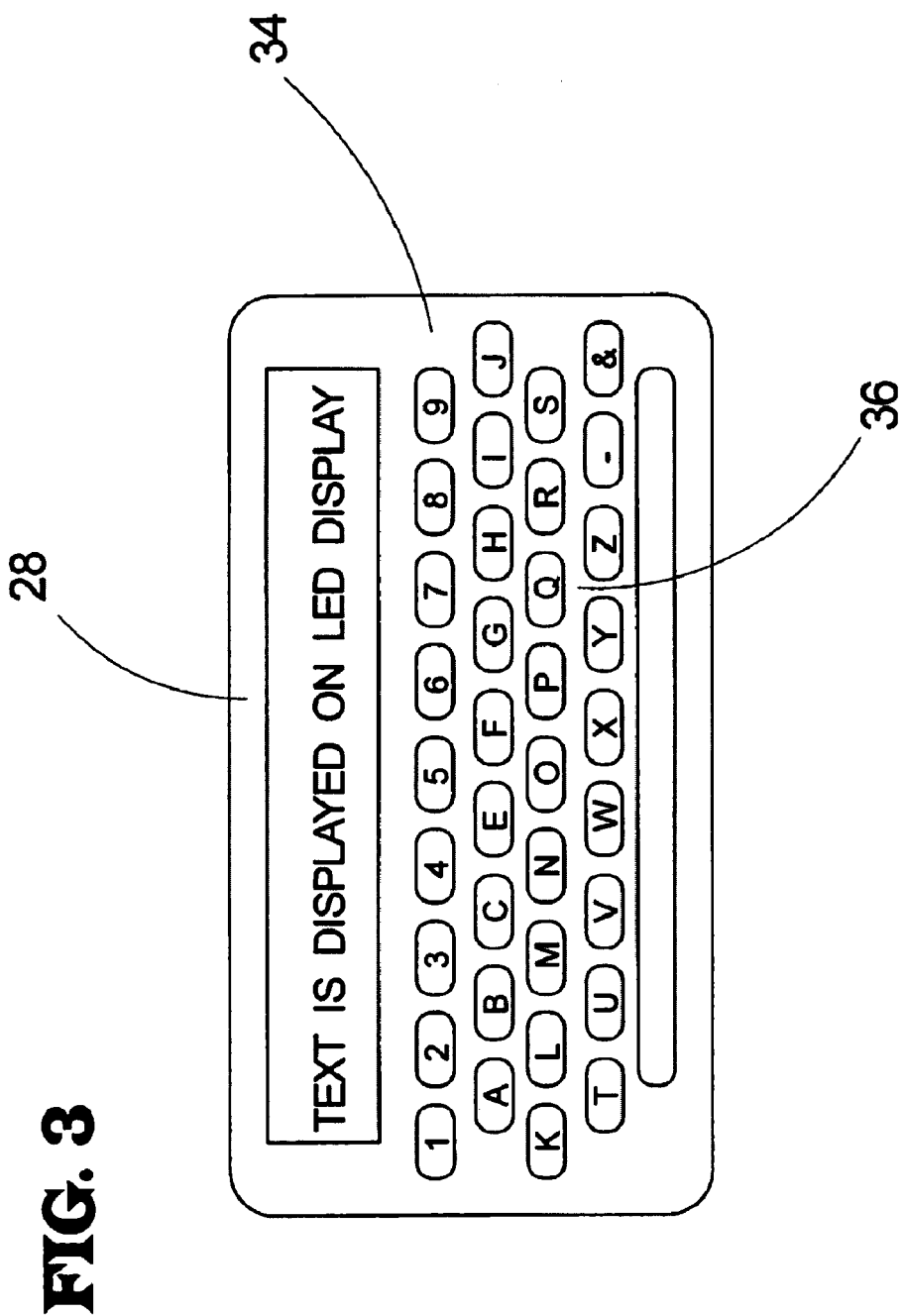
FIG. 3 is a front view of the remote transmitting member of the present invention.

With reference now to the drawings, and in particular to FIGS. 1 through 4 thereof, a new message display system embodying the principles and concepts of the present invention and generally designated by the reference numeral 10 will be described.

As best illustrated in FIGS. 1 through 4, the message display system 10 generally comprises a main housing 12 that is coupled to a vehicle 14. The main housing 12 has bezel portion 16 designed for encompassing a perimeter edge 18 of a license plate 20. The main housing 12 has a top display means 22 for presenting a visual message. The top display means 22 is medially positioned on a top portion 24 of the main housing 12. A receiver portion 26 is operationally coupled to the top display means 22. The receiver portion 26 is positioned substantially within the housing. The receiver portion 26 facilitates input of a message to be visually presented. A remote transmitter member 28 is designed for receiving user input of a message to be visually presented. The remote transmitter member 28 is operationally couplable to the receiver portion 26 such that the message is communicated from the remote transmitter 28 to the receiver portion 26.

A lower display means 30 is positioned medially on a lower portion 32 of the main housing 12. The lower display means 30 is operationally coupled to the receiver portion 26. The lower display means 30 is for displaying a second visual message.

The remote transmitter member 28 further includes a remote transmitter housing 34. A keyboard portion 36 is positioned on a first surface of the housing 34. The keyboard portion 36 is an interface for receiving the message from the user. A transmitter portion 38 is positioned substantially within the housing. The transmitter portion 38 is operationally coupled to the keyboard portion 36. The transmitter portion 38 is for transmitting the message to the top display means 22 and the lower display means 30. The top display means 22 is a display selected from the group of display consisting of liquid crystal display, light emitting diode array, and cathode ray tube.

The lower display means 30 is a display selected from the group of display consisting of liquid crystal display, light emitting diode array, and cathode ray tube.

The remote transmitter member 28 emits a radio frequency signal representing the message. The receiver portion 26 is designed for receiving radio frequency signals. The receiver portion 26 converts the radio frequency signal to an electrical signal representation of the message.

The remote transmitter member 28 emits an infra-red signal representing the message. The receiver portion 26 is designed for receiving infra-red signals. The receiver portion 26 converts the infra-red signal to an electrical signal representation of the message.

The main housing 12 has a height of approximately 6 inches, the main housing has a width of approximately 12 inches. The remote transmitter housing 34 has a width in the range between 2 and 3 inches inclusive. The remote transmitter housing has a length in the range between 3 and 12 inches inclusive.

In use, a user would mount the present invention around the license plate located on a vehicle. The user would connect the present invention to a power source. The user could then input messages via a remote transmitter member to be displayed on the upper and lower display members on the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A message display system for use in conjunction with vehicle license plates, comprising:
   a main housing couplable to a vehicle, said main housing having bezel portion adapted for encompassing a perimeter edge of a license plate, said main housing having a top display means for presenting a visual message, said top display means being medially positioned on a top portion of said main housing;
   a receiver portion operationally coupled to said top display means, said receiver portion being positioned substantially within said housing, said receiver portion facilitating input of a message to be visually presented;
   a remote transmitter member adapted for receiving user input of a message to be visually presented, said remote transmitter member being operationally couplable to said receiver portion such that said message is communicated from said remote transmitter to said receiver portion.

2. The system of claim 1, further comprising a lower display means positioned medially on a lower portion of said main housing, said lower display means being operationally coupled to said receiver portion, said lower display means being for displaying a second visual message.

3. The system of claim 1, wherein said remote transmitter member further comprises:
   a remote transmitter housing;
   a keyboard portion positioned of a first surface of said housing, said keyboard portion being an interface for receiving said message from the user; and
   a transmitter portion positioned substantially within said housing, said transmitter portion being operationally coupled to said keyboard portion, said transmitter portion being for transmitting said message to said top display means.

4. The system of claim 3 wherein the keyboard portion includes a plurality of keys.

5. The system of claim 4 wherein the plurality of keys includes alphanumeric keys.

6. The system of claim 1, further comprising a lower display means positioned medially on a lower portion of said main housing, said lower display means being operationally coupled to said receiver portion, said lower display means being for displaying a second visual message;
   wherein said remote transmitter member further comprises:
   a remote transmitter housing;
   a keyboard portion positioned of a first surface of said housing, said keyboard portion being an interface for receiving said message from the user; and
   a transmitter portion positioned substantially within said housing, said transmitter portion being operationally coupled to said keyboard portion, said transmitter portion being for transmitting said message to said top display means;
   wherein the keyboard portion includes a plurality of keys; and
   wherein the plurality of keys includes alphanumeric keys.

7. A message display system for use in conjunction with vehicle license plates, comprising:
   a main housing couplable to a vehicle, said main housing having bezel portion adapted for encompassing a perimeter edge of a license plate, said main housing having a top display means for presenting a visual message, said top display means being medially positioned on a top portion of said main housing;
   a receiver portion operationally coupled to said top display means, said receiver portion being positioned substantially within said housing, said receiver portion facilitating input of a message to be visually presented;
   a remote transmitter member adapted for receiving user input of a message to be visually presented, said remote transmitter member being operationally couplable to said receiver portion such that said message is communicated from said remote transmitter to said receiver portion;
   a lower display means positioned medially on a lower portion of said main housing, said lower display means being operationally coupled to said receiver portion, said lower display means being for displaying a second visual message;
   said remote transmitter member further comprises:
   a remote transmitter housing;
   a keyboard portion positioned on a first surface of said housing, said keyboard portion being an interface for receiving said message from the user; and
   a transmitter portion positioned substantially within said housing, said transmitter portion being operationally coupled to said keyboard portion, said transmitter portion being for transmitting said message to said top display means and said lower display means.

8. The system of claim 7, wherein said top display means being a display selected from the group of display consisting of liquid crystal display, light emitting diode array, and cathode ray tube.

9. The system of claim 7, wherein said lower display means being a display selected from the group of display consisting of liquid crystal display, light emitting diode array, and cathode ray tube.

10. The system of claim 7, wherein said remote transmitter member emitting a radio frequency signal representing said message, said receiver portion being adapted for receiving radio frequency signals, said receiver portion converting said radio frequency signal to an electrical signal representation of said message.

11. The system of claim 7, wherein said remote transmitter member emitting an infra-red signal representing said message, said receiver portion being adapted for receiving infra-red signals, said receiver portion converting said infra-red signal to an electrical signal representation of said message.

12. The system of claim 7, wherein said main housing having a height of approximately 6 inches, said main housing having a width of approximately 12 inches.

13. The system of claim 7, wherein said remote transmitter housing having a width in the range between 2 and 3 inches inclusive, said remote transmitter housing having a length in the range between 3 and 12 inches inclusive.

14. The system of claim 7, wherein said transmitter portion and said receiver portion using a coding system for inhibiting interference and unauthorized use.

15. The system of claim 7, wherein said top display portion having a processing means for modifying a presentation of said message such that said message scrolls across said top display portion.

16. The system of claim 7, wherein said lower display portion having a processing means for modifying a presentation of said message such that said message scrolls across said lower display portion.

17. The system of claim 7 wherein the keyboard portion includes a plurality of keys.

18. The system of claim 17 wherein the plurality of keys includes alphanumeric keys.

19. The system of claim 7, wherein said top display means is a display selected from the group of display consisting of liquid crystal display, light emitting diode array, and cathode ray tube;

wherein said lower display means is a display selected from the group of display consisting of liquid crystal display, light emitting diode array, and cathode ray tube;

wherein said remote transmitter member emits a radio frequency signal representing said message, said receiver portion being adapted for receiving radio frequency signals, said receiver portion converting said radio frequency signal to an electrical signal representation of said message;

wherein said main housing has a height of approximately 6 inches, said main housing having a width of approximately 12 inches;

wherein said remote transmitter housing has a width in the range between 2 and 3 inches inclusive, said remote transmitter housing having a length in the range between 3 and 12 inches inclusive;

wherein said transmitter portion and said receiver portion use a coding system for inhibiting interference and unauthorized use;

wherein said top display portion has a processing means for modifying a presentation of said message such that said message scrolls across said top display portion;

wherein said lower display portion has a processing means for modifying a presentation of said message such that said message scrolls across said lower display portion;

wherein the keyboard portion includes a plurality of keys; and wherein the plurality of keys includes alphanumeric keys.

* * * * *